United States Patent
Ferrari et al.

(10) Patent No.: US 9,372,309 B2
(45) Date of Patent: Jun. 21, 2016

(54) METHOD FOR MAKING A SPLICE BETWEEN OPTICAL FIBRES IN A JOINT DEVICE FOR ELECTRICAL CABLES

(75) Inventors: Alberto Ferrari, Milan (IT); Roberto Riolo, Milan (IT); Fabio Abbiati, Milan (IT)

(73) Assignee: PRYSMIAN S.P.A, Milan (IT)

(*) Notice: Subject to any disclaimer, the term of this patent is extended or adjusted under 35 U.S.C. 154(b) by 407 days.

(21) Appl. No.: 14/116,543

(22) PCT Filed: Apr. 10, 2012

(86) PCT No.: PCT/EP2012/056444
§ 371 (c)(1),
(2), (4) Date: Jan. 23, 2014

(87) PCT Pub. No.: WO2012/156153
PCT Pub. Date: Nov. 22, 2012

(65) Prior Publication Data
US 2014/0144017 A1    May 29, 2014

(30) Foreign Application Priority Data
May 16, 2011  (IT) .............................. MI2011A0855

(51) Int. Cl.
*G02B 6/255*    (2006.01)
*G02B 6/44*    (2006.01)
*H02G 15/18*    (2006.01)

(52) U.S. Cl.
CPC .............. *G02B 6/255* (2013.01); *G02B 6/2558* (2013.01); *G02B 6/4416* (2013.01); *H02G 15/18* (2013.01); *G02B 6/4448* (2013.01); *Y10T 29/49195* (2015.01)

(58) Field of Classification Search
CPC .... G02B 6/255; G02B 6/2558; G02B 6/4416; G02B 6/4448; H02G 15/18; Y10T 29/49195
See application file for complete search history.

(56) References Cited

U.S. PATENT DOCUMENTS

| | | | | |
|---|---|---|---|---|
| 4,846,545 A | * | 7/1989 | Estabrook | G02B 6/4476 385/99 |
| 6,904,222 B2 | * | 6/2005 | Cooke | G02B 6/2558 367/140 |

(Continued)

FOREIGN PATENT DOCUMENTS

| | | |
|---|---|---|
| DE | 39 05 090 A1 | 8/1990 |
| DE | 42 40 171 A1 | 6/1994 |

(Continued)

OTHER PUBLICATIONS

International Search Report from the European Patent Office for International Application No. PCT/EP2012/056444, mailing date May 21, 2012.

(Continued)

*Primary Examiner* — Carl Arbes
(74) *Attorney, Agent, or Firm* — Finnegan, Henderson, Farabow, Garrett & Dunner, L.L.P.

(57) ABSTRACT

A method for making a splice between optical fibers in a joint device suitable for housing the joint between a first electrical cable includes a first optical fiber and a second electrical cable including a second optical fiber. The joint device includes a sleeve having a cylindrical portion. The method includes (i) splicing the first optical fiber and the second optical fiber so as to form the splice and (ii) winding at least a portion of the excess length of the first optical fiber and at least a portion of the excess length of the second optical fiber around the cylindrical portion of the sleeve in a helix substantially coaxial with the cylindrical portion.

10 Claims, 3 Drawing Sheets

(56) References Cited

U.S. PATENT DOCUMENTS

| | | | |
|---|---|---|---|
| 2004/0264893 A1* | 12/2004 | Cooke | G02B 6/2558 385/99 |
| 2005/0129375 A1* | 6/2005 | Elkins, II | G02B 6/4472 385/100 |

FOREIGN PATENT DOCUMENTS

| | | |
|---|---|---|
| DE | 43 23 762 C1 | 7/1994 |
| DE | 197 02 804 C1 | 6/1998 |
| EP | 0 735 639 A1 | 10/1996 |
| EP | 2 113 978 A1 | 11/2009 |
| FR | 2 782 203 | 2/2000 |
| WO | WO 00/08732 | 2/2000 |

OTHER PUBLICATIONS

"Raychem Fibre-Optic Add-On Kit for HV Cable Accessories", Tyco Electronics EPP 1623, Tyco Electronics Raychem GMBH, pp. 1-2, (2009).

* cited by examiner

METHOD FOR MAKING A SPLICE BETWEEN OPTICAL FIBRES IN A JOINT DEVICE FOR ELECTRICAL CABLES

CROSS REFERENCE TO RELATED APPLICATIONS

This application is a national phase application based on PCT/EP2012/056444, filed Apr. 10, 2012, and claims the priority of Italian Patent Application No. MI2011A000855, filed May 16, 2011, the content of both applications being incorporated herein by reference.

BACKGROUND OF THE INVENTION

1. Field of the Invention

The present invention relates to the field of cables for transmitting and/or distributing electricity. In particular, the present invention relates to a method for making a splice between optical fibres in a device for forming a joint between electrical cables, particularly (but not exclusively) medium- or high-voltage cables.

2. Description of the Related Art

A cable for transmitting and/or distributing electricity typically comprises one or more conductive cores. Each conductive core generally comprises a metal conductor surrounded by an insulating layer and preferably by an inner semiconducting layer and an outer semiconducting layer. In particular, if the cable is a high-voltage type, the conductive core or cores are in turn surrounded by a metal screen (generally made of aluminium, lead or copper), outside which a protective polymer sheath is provided.

In the present description, the term "medium voltage" refers to a voltage typically in the range from about 1 KV to about 30 KV, while the term "high voltage" refers to a voltage of more than 30 KV.

In order to join two electrical cables (each having a single conductive core, for example), a portion of each of their ends is stripped, so that the metal conductors are exposed. The metal conductors of the two cables are then connected electrically and a joint device is fitted on their ends. The primary function of the joint device is to insulate the conductors electrically and to provide mechanical protection for the area of the joint between the cables.

A joint device generally comprises a sleeve which is fitted directly on the ends of the cables, and an outer protective casing in which the sleeve is housed. A sleeve fitted directly on the ends of the cables is described for example in patent application EP 0735639 A1. An outer protective casing is described for example in patent application EP 2113978 A1.

The sleeve may comprise different layers, each having a different function. For example, starting from the innermost layer, a sleeve may comprise a tubular electrode made of a semiconducting material which performs the function of controlling the electrical field, a tubular insulator which covers the electrode, and an outer semiconducting covering which covers the tubular insulator and which performs the function of interconnecting the ends of the outer semiconducting layers of the two joined cables. The sleeve usually has a substantially cylindrical central portion and two substantially conical opposing end portions, through which the two cable ends enter the sleeve.

After the sleeve has been fitted on the joined cable ends, it is housed in the outer casing, which is typically made of a metallic material (such as copper), as described in the above mentioned patent application EP 2113978 A1, and which performs the function of ensuring electrical continuity between the metal screens of the two joined cables.

An electrical cable for transmitting and/or distributing energy can also comprise one or more optical fibres. The optical fibres can be used, for example, for transmitting data, or for monitoring the operation of the electrical cable. The optical fibres of an electrical cable are usually housed in a protective metal tube, which is in turn inserted among the metal wires of the metal screen of the cable.

When two ends of electrical cables comprising optical fibres are joined together, the optical fibres must also be spliced together.

The document "Raychem Fibre Optic Add-On Kit for HV Cable Accessories", which can be found at the URL:
http://energy.tycoelectronics.com/transmission/fibreoptic.pdf, describes a kit for installing optical fibres in a joint device for high-voltage electrical cables. The kit comprises a splice tray which is housed in a suitable compartment of the outer casing. The compartment and the splice tray are accessible from outside the casing.

The kit described above has a number of drawbacks.

First of all, the need to provide a splice tray and a corresponding compartment for housing it disadvantageously entails an increase in the cost and overall dimensions of the outer casing, and therefore of the joint device as a whole. Furthermore, since the splice tray is positioned so as to be accessible from the outside of the casing, additional mechanical protection must be provided in order to protect adequately the optical fibres housed therein, and this further increases the cost and overall dimensions of the outer casing and therefore of the joint device as a whole. On the other hand, the accessibility of the splice tray from the outside of the outer casing is generally superfluous, since—once the splices have been made between the optical fibers—it is not normally necessary to carry out any other operation on the optical fibres.

SUMMARY OF THE INVENTION

The aforementioned problem is resolved by a method for making a splice between optical fibres in a joint device for electrical cables, in which method the optical fibres emerging from the two joined cables are spliced together and their excess lengths are wound around the body of the sleeve in a helix which is substantially coaxial with the body of the sleeve.

According to a first embodiment, the ends of the optical fibres are spliced together firstly, and their excess lengths are then wound around the sleeve. In this case, the excess lengths of the optical fibres are wound in an open helix or "Ω" arrangement. According to a second embodiment, the excess lengths of the optical fibres are wound around the sleeve firstly, and their ends are spliced together subsequently. In this case, the excess lengths of the optical fibres may be wound in either a closed helix or an open helix or "Ω" arrangement.

In all of these cases, there is no need to provide a dedicated splice support device. This is because the sleeve itself acts as a mandrel around which the excess lengths of the optical fibres are wound. Thus the sleeve itself ensures that the optical fibres are not bent with a bending radius less than the minimum bending radius, especially when they are subjected to pulling. Furthermore, the excess lengths of the optical fibres and the splices are advantageously well protected against impacts and mechanical stresses, because they are housed inside the outer casing of the joint device. Consequently there is no need to provide any additional mechanical protection in the joint device.

According to one aspect of the present invention, a method for making a splice between optical fibres in a joint device suitable for housing a joint between a first electrical cable comprising a first optical fibre and a second electrical cable comprising a second optical fibre, the joint device comprising a sleeve having a cylindrical portion, comprises:

i) splicing the first optical fibre and the second optical fibre in order to form the splice; and ii) winding at least a portion of an excess length of the first optical fibre and at least a portion of an excess length of the second optical fibre around the cylindrical portion of the sleeve in a helix substantially coaxial with the cylindrical portion.

According to a first embodiment, step i) is performed before step ii), and step ii) comprises winding the at least a portion of the excess length of the first optical fibre and the at least a portion of the excess length of the second optical fibre around the cylindrical portion of the sleeve in an open helix or "Ω" arrangement substantially coaxial with the cylindrical portion.

According to a second embodiment, step i) is performed after step ii), and step ii) comprises winding the at least a portion of the excess length of the first optical fibre and the at least a portion of the excess length of the second optical fibre around the cylindrical portion of the sleeve in a closed helix substantially coaxial with the cylindrical portion.

Preferably, step i) comprises protecting at least one of the splice, the at least a portion of the excess length of the first optical fibre, and the at least a portion of the excess length of the second optical fibre, by means of at least one tube.

Preferably, step i) comprises, before splicing, fitting a first tube on the excess length of the first optical fibre so that the free end of the first optical fibre emerges through the first tube, and fitting a second tube on the excess length of the second optical fibre so that the free end of the second optical fibre emerges through the second tube.

Preferably, step i) comprises, before splicing, locking the first tube relative to the first optical fibre and locking the second tube relative to the second optical fibre by means of first fixing members.

Preferably, step i) comprises, before splicing, fitting a third tube on the first tube so that it is slidable relative to the first tube and so that the free end of the first optical fibre also emerges through the third tube.

Preferably, step i) comprises, after splicing, moving the third tube on to the splice and fastening the third tube to the first tube and the second tube by means of second fixing members.

According to preferred embodiments, the first tube, the second tube and the third tube are made of flexible material.

According to preferred embodiments, at least one of the first fixing members and the second fixing members comprises at least one strap.

BRIEF DESCRIPTION OF THE DRAWINGS

The present invention will be made clearer by the following detailed description, provided by way of non-limiting example, to be read with reference to the accompanying drawings, in which.

DETAILED DESCRIPTION OF THE INVENTION

Figure 1:
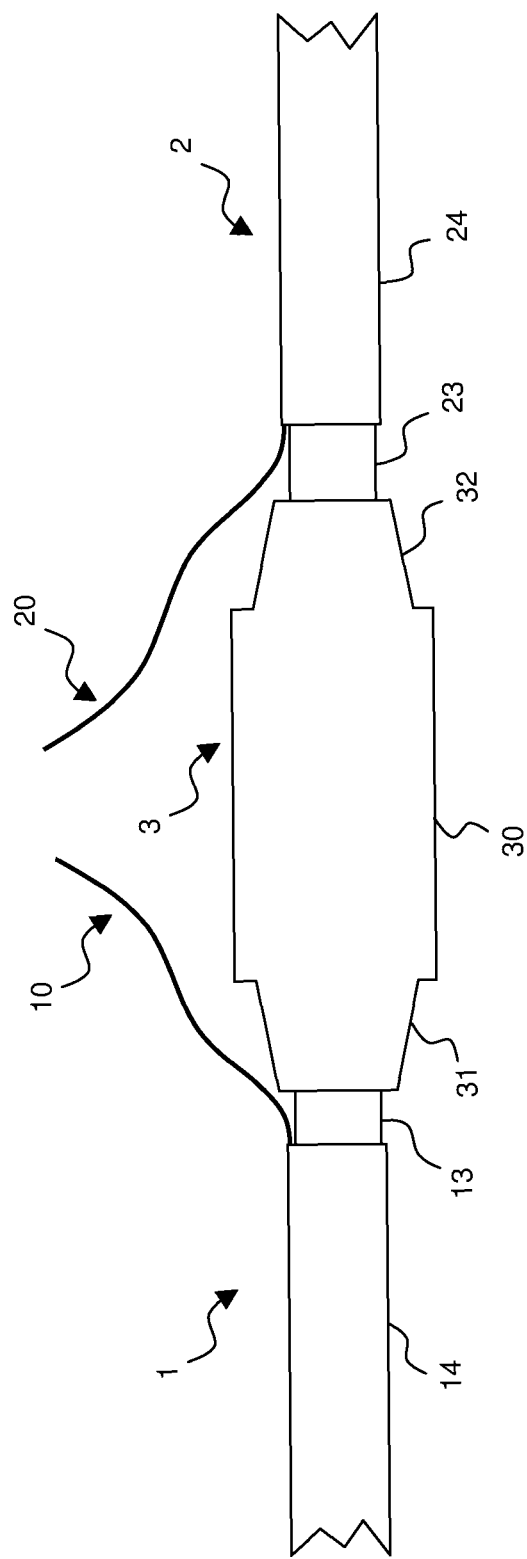
FIG. 1 schematically shows a sleeve of a joint device between two electrical cables for distributing and/or transmitting electricity.

FIG. 1 shows a sleeve 3 of a joint device for electrical cables (particularly, but not exclusively, medium- or high-voltage cables), to which the method for making a splice between optical fibres of electrical cables can be applied according to embodiments of the present invention.

The sleeve 3 comprises a hollow body which forms a tubular through cavity (not visible in FIG. 1) suitable for receiving the end of a first cable 1 and the end of a second cable 2. The hollow body preferably comprises a central portion 30 and two end portions 31, 32, through which the ends of the first cable 1 and the second cable 2 enter the sleeve 3. The central portion 30 of the sleeve 3 has a substantially cylindrical shape. The end portions 31, 32 preferably have a conical shape with the vertex towards the outside of the sleeve 3. The internal structure of the sleeve 3 will not be described in detail, since it is unnecessary for the purposes of the present description.

The first cable 1 and the second cable 2 are preferably electrical cables for transmitting and/or distributing energy. In particular, the first cable 1 and the second cable 2 may be high-voltage or medium-voltage cables. The first cable 1 and the second cable 2 may each comprise one or more metal conductors and one or more layers surrounding the conductors (for example, an inner semiconducting layer, an insulating layer, an outer semiconducting layer, a metal screen and a polymer protective sheath). The first cable 1 and the second cable 2 are both of the same type, i.e. have the same structure. The structure of the first cable 1 and the second cable 2 will not be described further and is not shown in the drawings, since it is not necessary for the purposes of the present description.

In addition to the metal conductors and the aforementioned layers, the first cable 1 comprises a first optical unit 10, and similarly the second cable 2 comprises a second optical unit 20. The first optical unit 10 and the second optical unit 20 each comprise a number of optical fibres 11, 21 (shown in FIG. 2) and a protective tube 12, 22 in which the optical fibres 11, 21 are housed. For example, each optical unit 10, 20 may comprise from 1 to 24 optical fibres 11, 21. The protective tubes 12, 22 are preferably made of metallic material, such as steel.

In the first cable 1 and in the second cable 2, the first optical unit 10 and the second optical unit 20 may be positioned between two adjacent layers of the cable, or may be embedded in the thickness of one of the layers of the cable. Preferably, since the first cable 1 and the second cable 2 have the same structure, the position of the first optical unit 10 within the first cable 1 is identical to the position of the second optical unit 20 within the second cable 2. For example, in a high-voltage cable, the first optical unit 10 (or second optical unit 20) may be inserted among the metal wires which form the metal screen of the first cable 1 (or second cable 2).

In order to join the first cable 1 and the second cable 2 together, their ends are cut so that the optical unit 10, 20 of each cable projects from the free end of the cable by a predetermined minimum length. This predetermined minimum length enables the splices to be made between the optical fibres 11, 21 after the sleeve 3 has been fitted on the ends of the first cable 1 and the second cable 2. This predetermined minimum length may be, for example, several meters.

The joint between the first cable 1 and the second cable 2 is formed by operations according to the prior art, for example as described in the previously cited patent application EP 0735639 A1.

At the end of these operations, the sleeve 3 is positioned so that it covers the area of the joint between the cables 1 and 2. In particular, the sleeve 3 covers the free portion of the metal conductors and the ends of the layers which cover the conductors and which are located within the optical units 10 and 20, while it leaves uncovered the ends of the layers not located within the optical units 10 and 20. In FIG. 1, the layer of the first cable 1 located immediately within the first optical unit 10 is indicated by the reference numeral 13, while the outermost layer of the first cable 1 is indicated by the reference numeral 14. Similarly, the layer of the second cable 2 located immediately within the second optical unit 20 is indicated by the reference numeral 23, while the outermost layer of the second cable 2 is indicated by the reference numeral 24.

Figure 2:
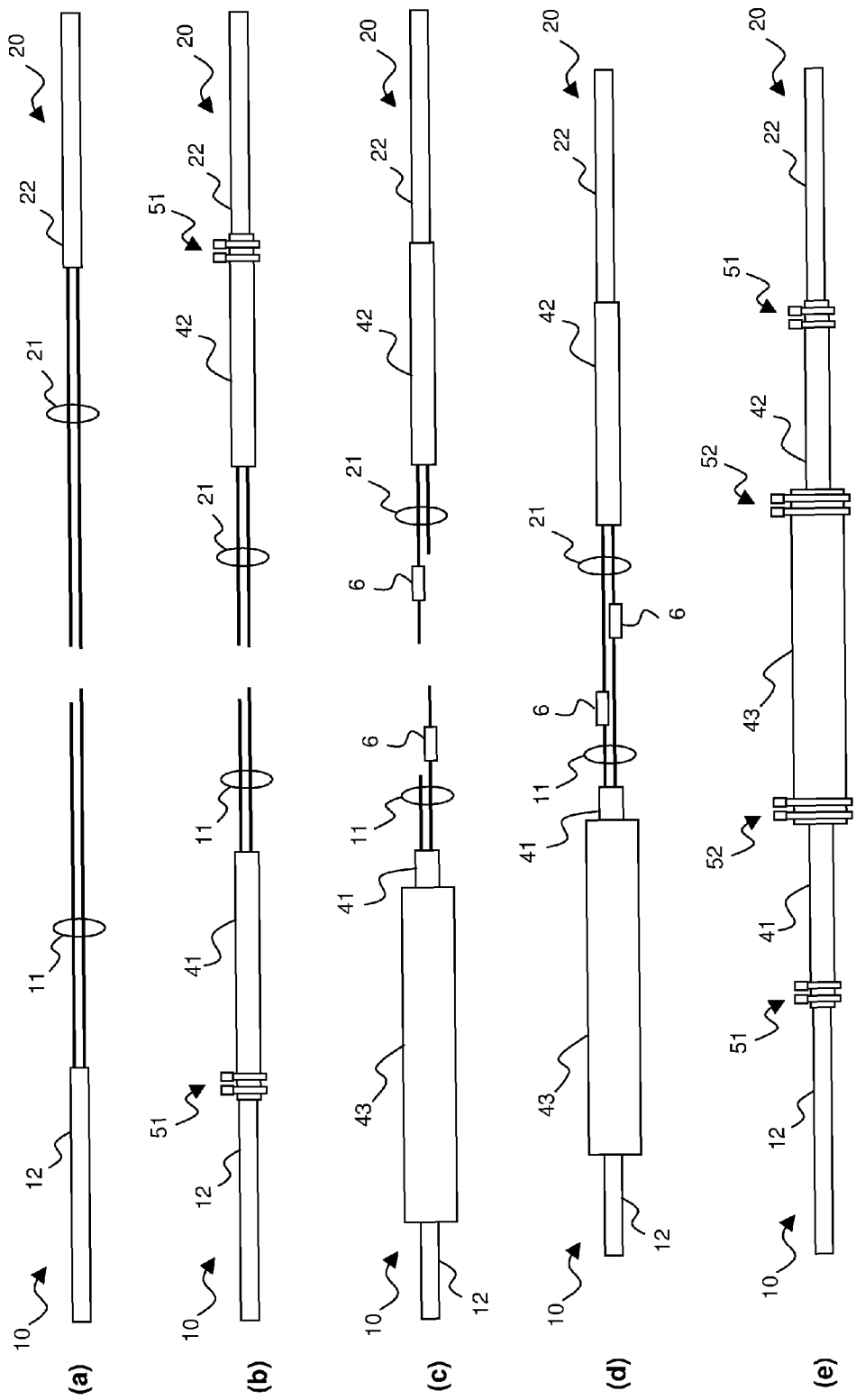
FIG. 2 shows five steps of the method for making a splice according to one embodiment of the present invention.

With reference now to FIG. 2, it is assumed, by way of non-limiting example, that the first optical unit 10 and the second optical unit 20 each comprise two optical fibres 11, 21.

During a first step a), a portion of the protective tube 12 of the first optical unit 10 is removed, so as to free a portion of the optical fibres 11 contained therein. The free portion of the optical fibres 11 may have, for example, a length of 2.5 m. Similarly, a portion of the protective tube 22 of the second optical unit 20 is removed, so as to free a portion of the optical fibres 21 contained therein. The free portion of the optical fibres 21 may have, for example, a length of 2 m.

In a subsequent step b), a first tube 41 is fitted on the protective tube 12 of the first optical unit 10 and is fixed thereto so that the free ends of the optical fibres 11 of the first optical unit 10 emerge through the first tube 41. Similarly, a second tube 42 is fitted on the protective tube 22 of the second optical fibre 20 and is fixed thereto so that the free ends of the optical fibres 21 of the second optical unit 20 emerge through the second tube 42. The first tube 41 and the second tube 42 are preferably made of flexible plastic material, such as silicone. The first tube 41 and the second tube 42 preferably have an inner diameter which is in the range from 1.6 mm to 2.0 mm, or more preferably equal to 1.8 mm. Additionally, the first tube 41 and the second tube 42 preferably have an outer diameter which is in the range from 2.5 mm to 3.5 mm, or more preferably equal to 3.0 mm. Additionally, the first tube 41 and the second tube 42 preferably have a length in the range from 1.5 m to 3 m. For example, the first tube 41 may have a length of approximately 2.5 m and the second tube 42 may have a length of approximately 2 m. In order to fix the first tube 41 and the second tube 42 to the respective protective tubes 12, 22, the first tube 41 and the second tube 42 are partially fitted over the ends of the respective protective tubes 12, 22 and are compressed around the latter by means of first fixing members 51. For example, the first fixing members 51 may comprise one or more plastic straps (by way of example, two plastic straps in FIG. 2).

After being compressed around the first tube 41 and the second tube 42, the first straps 51 may be fixed with an adhesive, for example a cyanoacrylate adhesive. Additionally, when the adhesive is dry, the first straps 51 may be covered with insulating tape, such as PVC (polyvinyl chloride) tape.

In a subsequent step d), a third tube 43 is fitted on one of the first tube 41 and the second tube 42, for example the first tube 41. The third tube 43 is not fixed to the first tube 41, but is left slidable relative thereto and is positioned so as to allow free access to the ends of the optical fibres 11 which emerge from the first tube 41. The third tube 43 is preferably also made of a flexible plastic material such as silicone. The third tube 43 preferably has a length of 2.5 to 3 m, more preferably approximately 2.7 m. The third tube 43 has an inner diameter greater than the outer diameter of the first tube 41 and the second tube 42, so that a clearance is present between them. This clearance is preferably large enough to allow the first fixing members 51 to be housed. Additionally, the outer diameter of the third tube 43 is smaller than the width of the annular space formed between the sleeve 3 and the outer casing (not shown in the drawings) in which the sleeve 3 is housed. The outside diameter of the third tube 43 is preferably in the range from 4 to 6 mm, more preferably approximately 5 mm.

In step c), the optical fibres 11, 21 are also prepared for the splicing operation. In particular, the optical fibres 11, 21 are preferably cut in such a way that the joints are in offset positions. Additionally, if fusion splices are used, heat-shrink splice covers 6 are fitted on the optical fibres 11, 21.

In a subsequent step d), the splices are made between the optical fibres 11 of the first optical unit 10 and the optical fibres 21 of the second optical unit 20. In particular, each optical fibre 11 of the first optical unit 10 is spliced to a corresponding optical fibre 21 of the second optical unit 20. The splices may be made with an arc fusion splicer of a known type. After each splice is made, it is covered with a corresponding heat-shrink splice cover 6.

In a subsequent step e), the third tube 43 is moved until it covers the splices and the ends of the first tube 41 and the second tube 42. The third tube 43 is then firmly fastened to the first tube 41 and the second tube 42. For this purpose, the opposite ends of the third tube 43 are partially fitted over the ends of the first tube 41 and the second tube 42, and are compressed around these ends by second fixing members 52. The second fixing members 52 may comprise one or more second plastic straps (by way of example, two plastic straps in FIG. 2).

After being compressed around the ends of the third tube 43, the second straps 52 may be fixed with adhesive, for example a cyanoacrylate adhesive. Additionally, when the adhesive is dry, the second straps 52 may be covered with insulating tape, such as PVC (polyvinyl chloride) tape.

Thus the first tube 41, the third tube 43 and the second tube 42 form a single elongate protective casing, which connects the ends of the protective tubes 12, 22 of the optical units 10, 20, and which continuously protects the splices and the excess lengths of the optical fibres 11, 21.

Figure 3:
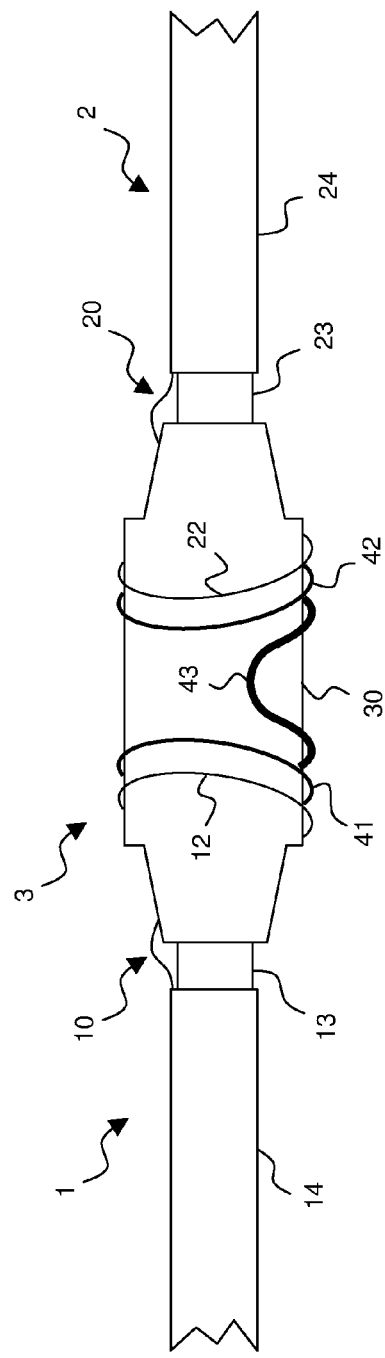
FIG. 3 shows the sleeve of FIG. 1 with the excess lengths of the spliced optical fibres wound around it, according to a first advantageous variant of the method of the invention.

When the operations shown in FIG. 2 are complete, the excess lengths of the optical fibres 11, 21 (with the corresponding splices) housed in the tubes 41, 42, 43 are wound around the sleeve 3. In particular, they are preferably wound around the cylindrical central portion 30 of the sleeve 3, so as to form a helix substantially coaxial with the sleeve 3. Since the optical fibres 11, 21 have been spliced before being wound around the sleeve 3, they are wound in an open helix or "Ω" arrangement, as shown in FIG. 3. The optical fibres 11, 21 may then be fastened to the sleeve 3, for example by fastening the third tube 43 to the outer surface of the sleeve 3 with a piece of adhesive tape.

Figure 4:
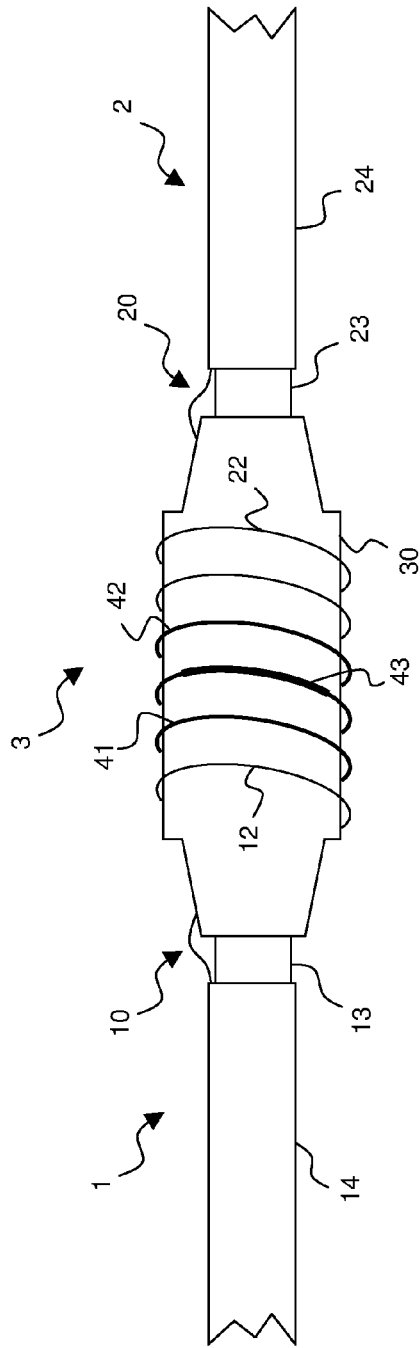
FIG. 4 shows the sleeve of FIG. 1 with the excess lengths of the spliced optical fibres wound around it, according to a second advantageous variant of the method of the invention.

According to other embodiments, the excess lengths of the optical fibres 11, 21 housed in the tubes 41, 42, 43 may be wound around the sleeve 3 before the splices are made between the optical fibres. For example, the excess lengths of the optical fibres 11, 21 may be wound around the sleeve 3 at the end of step c) described above, i.e. after the first tube 41 and the second tube 42 have been fastened to the ends of the protective tubes 12, 22 of the optical units 10, 20 and after the third tube 43 has been fitted on the first tube 41. In this case, the excess lengths of the optical fibres 11, 21 of the optical units 10, 20 may be wound around the sleeve 3 in the same direction of rotation, and steps d) and e) described above are only carried out after this operation. Thus the excess lengths of the optical fibres 11, 21 are wound around the sleeve 3 in a closed helix coaxial with the sleeve 3, as shown in FIG. 4. In this case also, after step e) the optical fibres 11, 21 may be fastened to the sleeve 3, for example by fastening the third tube 43 to the outer surface of the sleeve 3 with a piece of adhesive tape.

In the case of either an "Ω" winding or a closed helical winding, the installation of the joint device may be completed, for example by housing the sleeve 3 in an outer metal casing, after the excess lengths of the optical fibres 11, 21 have been fastened to the sleeve 3.

The excess lengths of the optical fibres 11, 21 of the optical units 10, 20 and the splices are thus housed in the space between the sleeve 3 and the outer casing, which therefore protects them from any impact or mechanical stress. Consequently it is unnecessary to provide any additional mechanical protection, which would increase the costs and the overall dimensions of the joint device.

Moreover, it is unnecessary to provide any other dedicated splice support device, which would further increase the cost and overall dimensions of the joint device. This is because the sleeve itself acts as a mandrel around which the excess lengths of the optical fibres 11, 21 are wound. Thus the sleeve 3 itself ensures that the optical fibres 11, 21 are not bent with a bending radius less than the minimum bending radius, especially when they are subjected to pulling. On the other hand, the space required around the sleeve 3 to house the excess lengths of optical fibres covered by the first, second and third tubes is very small. The resulting joint device is therefore advantageously highly compact.

The invention claimed is:

1. A method for making a splice between optical fibers in a joint device suitable for housing a joint between a first electrical cable comprising a first optical fiber and a second electrical cable comprising a second optical fiber, said joint device comprising a sleeve having a cylindrical portion, comprising:
   i) splicing said first optical fiber and said second optical fiber, thereby forming said splice; and
   ii) winding at least a portion of an excess length of said first optical fiber and at least a portion of an excess length of said second optical fiber about said cylindrical portion of said sleeve according to a helix substantially coaxial with said cylindrical portion.

2. The method according to claim 1, wherein i) splicing said first optical fiber and said second optical fiber is performed before ii) winding at least a portion of an excess length of said first optical fiber and at least a portion of an excess length of said second optical fiber, and wherein ii) winding at least a portion of an excess length of said first optical fiber and at least a portion of an excess length of said second optical fiber comprises winding said at least a portion of said excess length of said first optical fiber and said at least a portion of said excess length of said second optical fiber about said cylindrical portion of said sleeve according to an open helix or "Ω" substantially coaxial with said cylindrical portion.

3. The method according to claim 1, wherein splicing said first optical fiber and said second optical fiber is performed after ii) winding at least a portion of an excess length of said first optical fiber and at least a portion of an excess length of said second optical fiber, and wherein ii) winding at least a portion of an excess length of said first optical fiber and at least a portion of an excess length of said second optical fiber comprises winding said at least a portion of said excess length of said first optical fiber and said at least a portion of said excess length of said second optical fiber about said cylindrical portion of said sleeve according to a closed helix substantially coaxial with said cylindrical portion.

4. The method according to claim 1, wherein i) splicing said first optical fiber and said second optical fiber comprises protecting at least one of said splice, said at least a portion of said excess length of said first optical fiber and at least a portion of said excess length of said second optical fiber by means of a tube.

5. The method according to claim 4, wherein i) splicing said first optical fiber and said second optical fiber comprises, before splicing, fitting a first tube on said excess length of said first optical fiber so that a free end of said first optical fiber exits said first tube, and fitting a second tube on said excess length of said second optical fiber so that a free end of said second optical fiber exits said second tube.

6. The method according to claim 5, wherein i) splicing said first optical fiber and said second optical fiber comprises, before splicing, blocking said first tube relative to said first optical fiber and blocking said second tube relative to said second optical fiber by means of first fixing members.

7. The method according to claim 6, wherein i) splicing said first optical fiber and said second optical fiber comprises, before splicing, fitting a third tube on said first tube so that said third tube is slidable relative to said first tube and so that the free end of said first optical fiber exits said third tube.

8. The method according to claim 7, wherein i) splicing said first optical fiber and said second optical fiber comprises, after splicing, moving said third tube on said splice and fixing said third tube to said first tube and said second tube by means of second fixing members.

9. The method according to claim 7, wherein said first tube, said second tube and said third tube comprise a flexible material.

10. The method according to claim 8, wherein at least one of said first fixing members and said second fixing members comprises at least one strap.

* * * * *